United States Patent [19]

Gröttrup et al.

[11] 4,157,784

[45] Jun. 12, 1979

[54] SAFEGUARD AGAINST FALSIFICATION OF SECURITIES AND THE LIKE WHICH IS SUITABLE FOR AUTOMATIC MACHINES

[75] Inventors: Helmut Gröttrup; Wittich Kaule; Thomas Maurer; Gerhard Stenzel, all of Munich, Fed. Rep. of Germany

[73] Assignee: G.A.O. Gesellschaft fur Automation und Organisation mbH, Fed. Rep. of Germany

[21] Appl. No.: 913,942

[22] Filed: Jun. 9, 1978

Related U.S. Application Data

[63] Continuation of Ser. No. 595,427, Jul. 14, 1975, abandoned.

[30] Foreign Application Priority Data

Jul. 26, 1974 [AT] Austria ............................ 6178/74

[51] Int. Cl.² ................ G06K 19/06; G09F 3/02; G06K 19/02; B42D 15/00
[52] U.S. Cl. ............................. 235/491; 40/2.2; 283/7; 235/488; 235/494
[58] Field of Search .......... 235/491, 489, 494, 468, 235/469, 454, 487, 488; 250/569; 40/2.2; 283/57, 7; 360/2

[56] References Cited

U.S. PATENT DOCUMENTS

| 3,279,826 | 10/1966 | Rudershausen | 283/7 |
| 3,412,493 | 10/1967 | French | 40/2.2 |
| 3,455,577 | 7/1969 | Kikumoto | 283/57 |
| 3,536,894 | 10/1970 | Travioli | 235/491 |
| 3,594,933 | 7/1971 | Cooper | 40/2.2 |
| 3,786,237 | 1/1974 | Postal | 235/487 |

Primary Examiner—Robert M. Kilgore
Attorney, Agent, or Firm—McGlew and Tuttle

[57] ABSTRACT

The valuable papers, such as the securities and the like, have safeguard elements against forgery or falsification and which can be mechanically examined using light of the visible, ultraviolet or infrared spectral regions and which are effective, particularly, against erasure. The paper is provided with a homogeneous protective coating which is applied either prior to or following the application of an information print by an ink impression. The paper, the protective coating and the printing ink have respective reflectance or fluoroescence properties such that, any damage to the protective coating, such as an attempted erasure, is detectable either at the wavelength of light serving to read the information print or at a special test wavelength.

7 Claims, 20 Drawing Figures

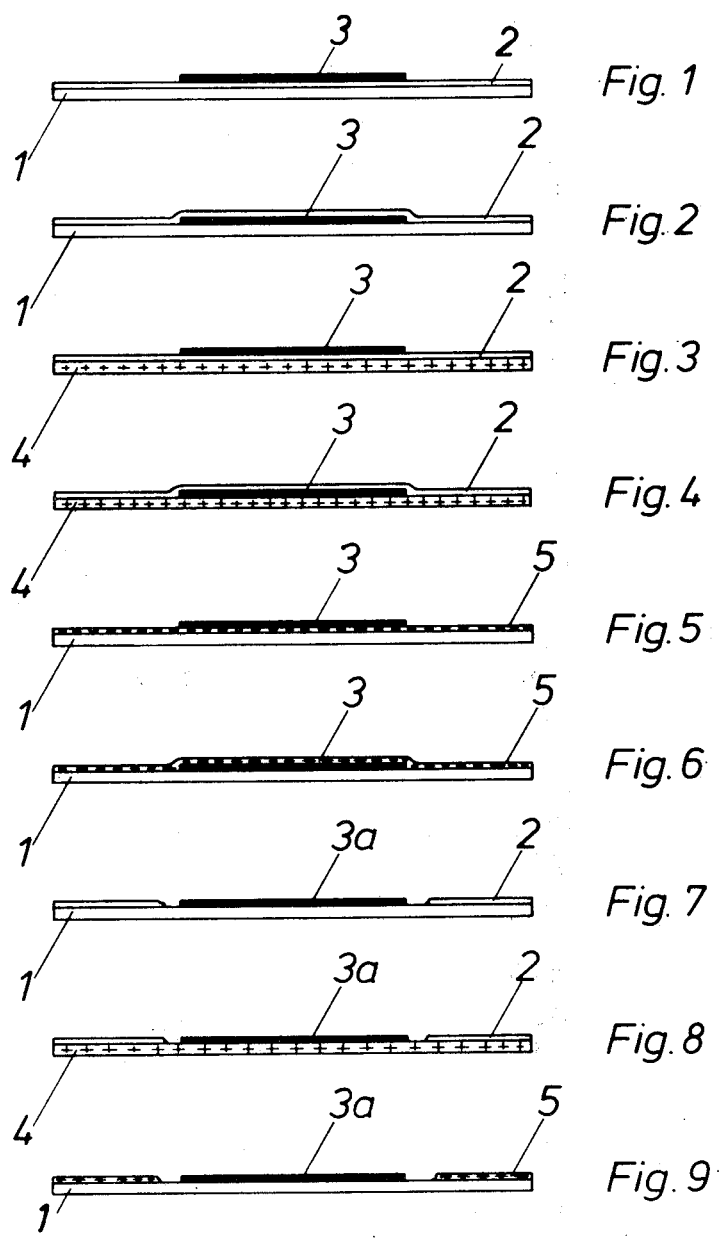

SAFEGUARD AGAINST FALSIFICATION OF SECURITIES AND THE LIKE WHICH IS SUITABLE FOR AUTOMATIC MACHINES

FIELD AND BACKGROUND OF THE INVENTION

This is a continuation of application Ser No. 595,427, filed July 14, 1975 and now abandoned.

The present invention relates to a safeguard against falsification of securities and the like which is suitable for automatic machines, i.e., can be evaluated by machine. By "securities and the like", there are to be understood all papers or paperlike information carriers which represent a spiritual value irrespective of their material value, e.g. bank notes, checks, shares, customer's or identity cards, passports, credit cards, or tickets. It is an important task to protect such documents against fraudulent falsification.

For instance, a defrauder can try to gain advantages by changing the amount or the account number of a check, the imprint on a ticket, the entries in an identification card, or some signature. With all these manipulations, the forger is forced to remove information present on the document by chemical or mechanical erasure. Such attempts at fraud are commonly made difficult by providing a safeguard against erasure. To this end, that area of the document which is to be protected is printed with a fine line pattern. If a forger tries to rub out the information on the document, he will inevitably damage this line pattern. Thus, any attempted erasure can be easily detected with the human eye. This safeguard against erasure fails to work, however, if the check of the information on the document is to be carried out by machine rather than by man. As is well known, the use of automatic document readers, automatic identification paper checking devices, automatic ticket cancelling machines, and various kinds of automatic code mark readers is on the increase.

SUMMARY OF THE INVENTION

It is therefore the object of the present invention to provide a safeguard against falsification which permits the addition and the removal of information symbols to be detected and evaluated by machine.

The subject matter of the invention is a security or the like with information machine-readable in the visible, ultraviolet, or infrared spectral regions and with a safeguard against falsification, particularly a safeguard against erasure, which is capable of being evaluated by machine.

The fundamental idea of the invention is to provide the security with a homogeneous protective coating which is applied either prior to or after the application of the information print, with the reflectance or fluorescence properties of security, protective coating, and information printing ink being such that any damage to the protective coating is detectable either at the wavelength of the light serving to read the information or at a special test wavelength. Thus, in principle, the information on a paper protected in this way as well as attempted erasures will appear as interruptions of the homogeneity of the protective coating.

Within the general principle of solution, three basic solutions are possible for the safeguard against erasure:

In the first solution, the different reflectance of paper, protective coating, and information printing ink with respect to different light wavelengths is utilized. The information is read at a wavelength at which the reflectivities of the protective coating and of the information printing ink greatly differ from each other so that the information can be well read. The check for attempted erasures is performed at a different wavelength at which the protective coating and the information print have the same or approximately the same reflectivity, while the reflectivities of the protective coating and of the paper are greatly different. During the check, undamaged or unmanipulated documents appear homogeneously dark (black). Attempted erasures result in interruptions of the homogeneity of the protective coating which, consequently, become visible as bright areas.

In the second solution, the protective coating has fluorescent properties, while the information printing ink and the paper do not fluoresce in the same wavelength range. Attempts at erasure as well as the information print show as dark interruptions of the homogeneous, fluorescent protective coating and can be detected by a suitably designed information reading device. In this solution, attempts at erasure are detected during the reading process. The reading and checking phases thus coincide.

In the third solution, the paper contains additivies with fluorescent properties which, however, are blocked by a non-fluorescent protective coating. This protective coating, which contrasts well in the reading area with the printing ink used, may be so constituted as to block either the excitation or the emission wavelength of the fluorescent substance in the paper. Printed on this protective coating is the information, which can be read with commonly used reading devices. To check for attempted erasures, a fluorescence checking device is used which, in a checking process different from the reading process, can detect the erased spots, at which the fluorescence of the paper has been exposed.

If the document is to be checked while being read, as is the case in the second solution, a light source must be used which, in spite of good contrast between the background and information print, also excites the fluorescent additives in the paper.

The safeguard against erasure which uses fluorescent substances is particularly proof against forgery if the fluorescent emission is chosen to lie outside the visible spectral region.

BRIEF DESCRIPTION OF THE DRAWINGS

These three solutions will now be explained with reference to the accompanying drawings and with the aid of a few examples. In the drawings, FIGS. 1 to 6 are sectional views of unmanipulated documents provided with safeguards against erasure;

FIGS. 7 to 9 are sectional views of manipulated documents where the erased spot has been overprinted;

DETAILED DESCRIPTION OF THE PREFERRED EMBODIMENT

FIGS. 1 to 11 show schematically the safeguarded security in sectional and top views. The thicknesses of paper and printing ink are deliberately shown not to scale to permit a clearer representation. In reality, the paper is about 100 times thicker than the information printing ink or the protective coating.

In FIGS. 1, 3, and 5, the protective coating 2, 5 is located between the paper 1, 4 and the information print 3, while in FIGS. 2, 4, and 6, the protective coating 2, 5 lies above the information print 3. The arrangement of FIGS. 1, 3, and 5 is of particular advantage if a finished security, provided with a safeguard against erasure, only needs to be printed and then is to be issued without any subsequent treatment. By contrast, the arrangement of FIGS. 2, 4, and 6 is of special advantage if a normal, commercially available document is to be provided with a safeguard against erasure at a later time.

Figure 10:
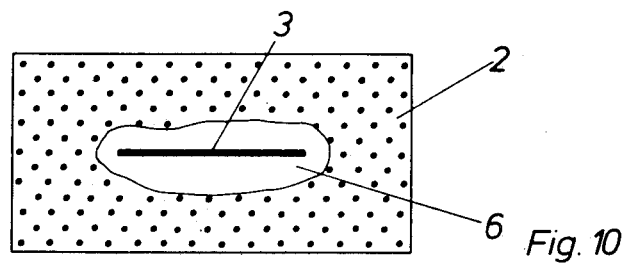
FIG. 10 is a top view of FIG. 8.
Figure 11:
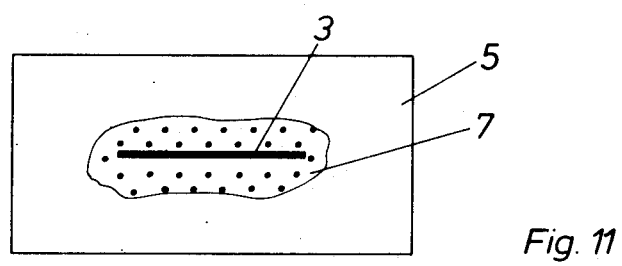
FIG. 11 is a top view of FIG. 9.

FIGS. 7, 8, and 9 show manipulated securities where the protective coating 2, 5 has been damaged by erasure, and a new symbol 3a has been overprinted. With these documents, depending on which of the methods described in the following was used, a spot at which an erasure was performed will show in the checking device as a bright area 6, as shown in FIG. 10, or as a dark area 7, as shown in FIG. 11 (dotted area).

The following description of six embodiments refers to these and the other figures in more detail.

First Example (Solution 1):

The document area to be protected is coated with an UV absorber, i.e. a paint which is practically invisible in the visible spectral region, while absorbing much more light than the document itself in the ultraviolet spectral region. If any optically readable information in the form of letters, strokes or other automatically recognizable symbols is imposed on such a surface using commercially available inks and commonly employed printing processes, as shown in FIG. 1, the readability of the information in the appropriate automatic reading devices, which operate in the visible spectral region, will not be adversely affected by the UV absorber. This will also be the case if the UV absorber is applied to the finished, printed document, as shown in FIG. 2.

Figure 19:
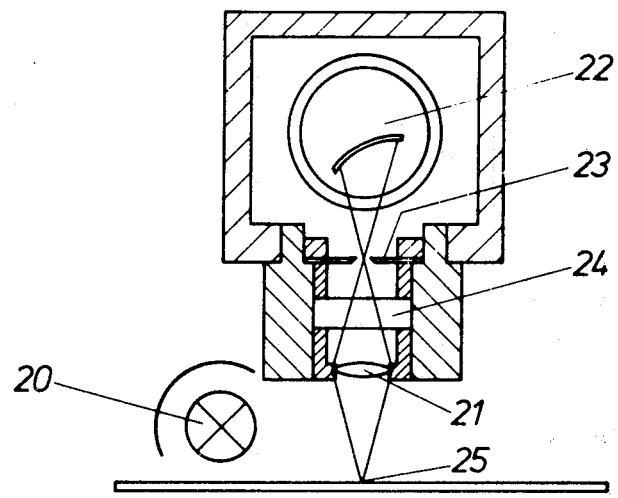
FIG. 19 shows a checking device for the first example.

Any damage to the area to be protected can be detected by means of a simple accessory apparatus as shown in FIG. 19. This apparatus consists of an UV light source 20, an imaging lens 21, and a photodetector 22 suitable for ultraviolet light, e.g. a photomultiplier. To insure that only the UV rays are detected by the photodetector 22, an optical band-pass filter 24 passing UV light is disposed in the path of rays. The field stop 23 delimits the document area 25 whose UV reflectance is detected and evaluated. In this apparatus, the undamaged area appears as a black area (dotted area in FIG. 10), while all spots at which erasure has been attempted show as bright spots 6. These bright spots are indicated in the accessory apparatus by a corresponding photoelectric current.

Figure 12:
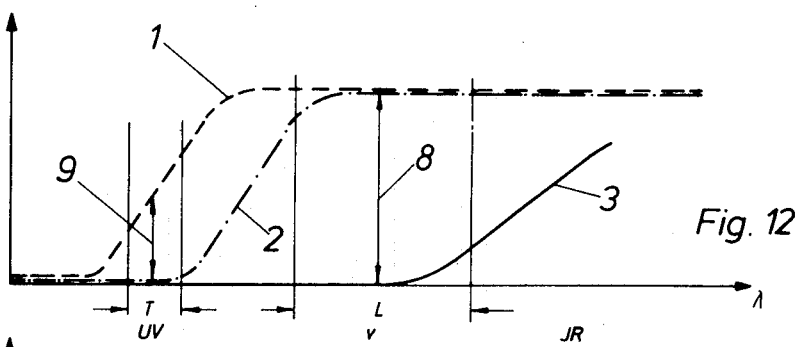
FIG. 12 shows the reflectance conditions between the protective coating of the paper and the printing ink in the first example.

For a better understanding, the reflectance conditions are shown in FIG. 12 as diagrams, with the diagram of the paper designated by 1, that of the protective coating by 2, and that of the information printing ink by 3. It can be seen that, in the reading region L, there is a great contrast 8 between the information printing ink 3 and the protective coating 2 for the reading of the information. In the test region T, the information printing ink 3 and the protective coating (UV absorber) have the same absorptive power. As a result, the printed area appears uniformly black. UV means "ultraviolet", v "visible", and IR "infrared". Attempted erasures represent an interruption of the protective coating by which the paper 1 is uncovered. Because of the reflectance difference 9 between the paper 1 and the protective coating 2, these uncovered spots appear in the checking device as bright spots.

Second Example (Solution 1):

Some organic coloring substances e.g. commercially available black stamp pad inks, have a high absorptive power in the visible spectral region, while showing high reflectance in the infrared spectral region. If the paper 1 to be protected (FIG. 1) is homogeneously printed with such a paint, and if the information 3 is printed on this coating 2 with a different black paint which has a high absorptive power in the infrared spectral region (e.g. lampblack paints), this information will not be visible to the naked eye. A reading device operating in the visible region cannot detect this information, either, but ascertains that the area is homogeneously black. This homogeneous blackening can be tested by machine in a first operation of testing. A reading device operating in the infrared spectral region can read the information unambiguously since the background now shows a high reflectance, i.e. looks comparatively white, while the information print has a high absorptive power, i.e. looks comparatively black (reading operation and second operation of testing).

Attempted erasures either appear as bright spots (FIG. 10) during the first testing operation or, if veiled following the erasure using a black paint different from that employed for the safeguard, as dark spots during reading, as shown in FIG. 11, which also results in this document being rejected.

Figure 13:
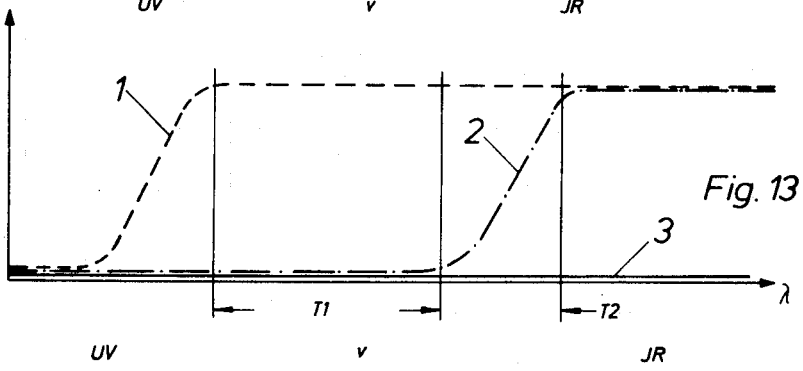
FIG. 13 shows the reflectance conditions between the protective coating of the paper and the printing ink in the second example.

The spectral conditions of this example are illustrated in FIG. 13. In the test region $T_1$, the high reflectance of the paper 1 is blocked by the protective coating 2, which looks black in this region. Since the protective coating 2 and the information printing ink 3 have the same reflectance, the print is not perceivable. In the test region $T_2$, the reflectance of the protective coating 5 corresponds approximately to that of the paper 1, whereby the still highly absorptive information printing ink 3 contrasts well with the background.

Figure 14:
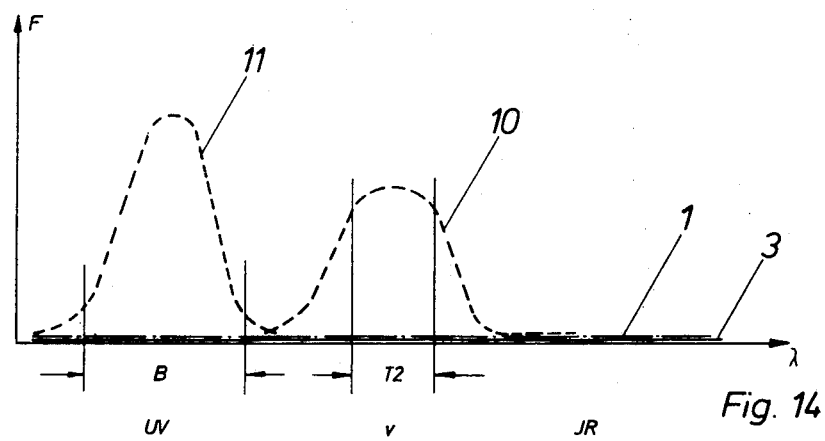
FIG. 14 shows the fluorescent-emission spectrum for the third example.

Third Example (Solution 2):

The paper to be protected is coated with a colorless or a colored luminous paint, a so-called daylight fluorescent ink. On this layer 5, the optically readable information 3 is imposed with commercially available inks by the usual printing technique. Suitable reading devices are all commonly used devices whose photoelectric components are sensitive in the wavelength range of the fluorescent emission F (FIG. 14, curve 10), and whose light sources were replaced by strong UV light sources without visible spectral region (FIG. 14, curve 11 with illumination region B). Experiments have shown that in the optical reading device, the printing contrast is enhanced by the fluorescent background, whereby the readability of the imprinted symbols is improved.

If a defrauder tries to remove the imprinted symbols 3, he will inevitably also remove the fluorescent layer 5 lying thereunder. To the reading device, spots manipulated in this way appear as black spots because, as shown in FIG. 14, the paper 1 and the information print 3 are highly absorptive in this spectral region. Thus, the reading device reads the erased symbols as if they were still present. If not only the symbol, but also part of the surrounding protective coating were removed, this spot will appears as a dark spot.

The defrauder cannot supplement the damaged fluorescent layer with fluorescent paint, either, since, if fluorescent paint is applied at a later time, variations of color and brightness will result which cause the reading device to reject the document. If another symbol 3a is printed or written on the erased symbol, as shown in FIG. 9, the reading device will be offered both the correct and the false symbol. This ambiguity also results in the respective document being rejected.

Fourth Example (Solution 2):

Practically all commercially available organic coloring substances fluoresce in the visible or near infrared spectral region. If such a layer of paint is irradiated with UV, visible, or near infrared light, it will emit light of a slightly longer wavelength. It is possible, for example, to apply to the document area to be protected a paint with 4-dimethylamino-4'-nitrostilbene in a uniform distribution and print the information thereon (FIG. 5).

Figure 20:
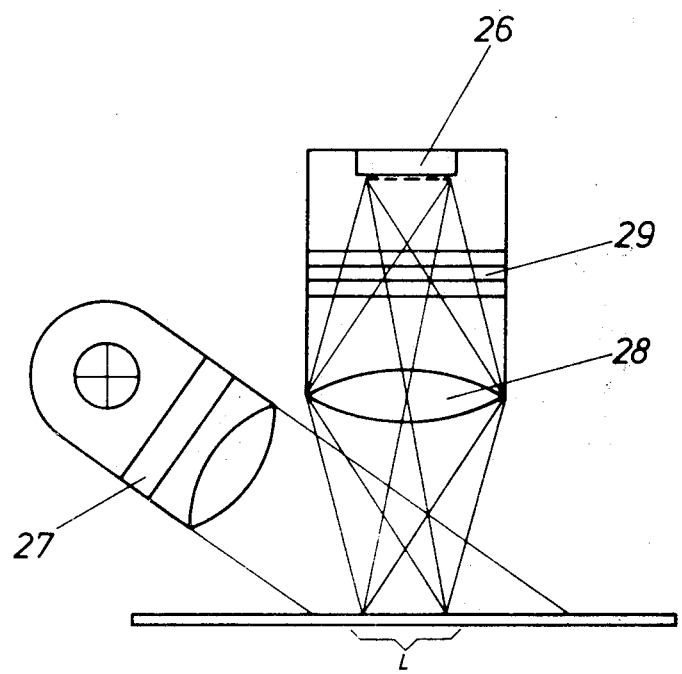
FIG. 20 shows a reading device for the second solution.

To read the information, a reading device as shown in FIG. 20 can be used, whose photodetectors 26 are sensitive in the infrared spectral region. The infrared spectral portion of the light source is blocked by so-called cold-light filters 27, while the visible spectral region is blocked in the ray path of the photolens 28 of the reading device by a suitable filter 29. In this manner, the reading device perceives the infrared-fluorescing layer 40 of paint as a luminous area, while discerning the information printed thereon as well as attempted erasures as dark spots.

Figure 15:
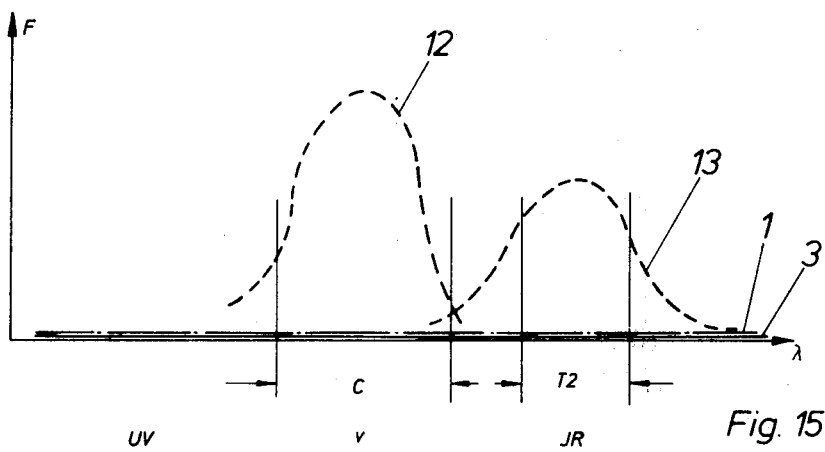
FIG. 15 shows the fluorescent-emission spectrum for the fourth example.

FIG. 15 shows the spectral conditions in this example. In the infrared region, the paper 1 without protective coating 5, just as the information printing ink 3, appears to the reading device dark or black. The protective coating 5 between the information print 3 and the paper 1 (see also FIG. 5) is excited in the visible spectral region C. In the infrared spectral region, this fluorescence excitation (curve 12) results in a fluorescent emission according to curve 13 through which a sufficient contrast to the information printing ink 3 is created for the reading device. Spots where the protective coating 5 was interrupted appear as dark spots as a result of the lack of fluorescent emission and can be detected by the reading device of FIG. 20 during the reading operation.

Fifth Example:

In the case of binary codings, which consist only of identical symbols, e.g. strokes and spaces, it is necessary to prevent, besides forgery by erasure, an additional possibility of forgery. A defrauder could falsify the information by entering additional strokes into the spaces between the strokes. This forgery can be excluded in combination with one of the solutions described by using an information code in which the total of the symbols and of the spaces is constant, while all possibilities of variation can be used for the distribution of symbols and spaces over the information line. Because of the safeguard against erasure, the forger cannot reduce the number of symbols. Since the number of symbols is known and is checked in the automatic reader, he cannot insert any further symbols, either.

Figure 16:
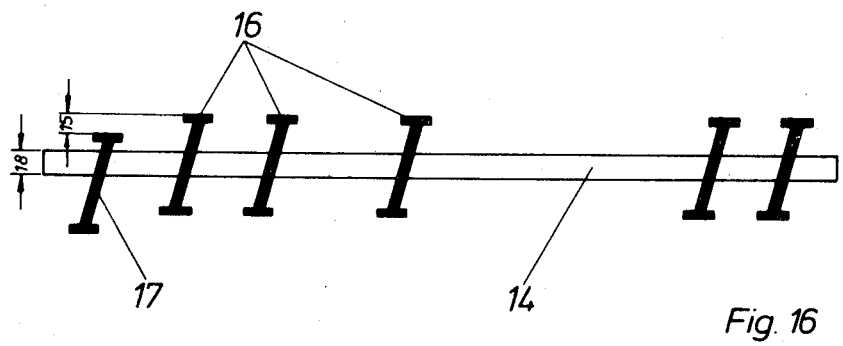
FIG. 16 shows an unmanipulated coding line with a safeguard against erasure for the fifth example.
Figure 17:
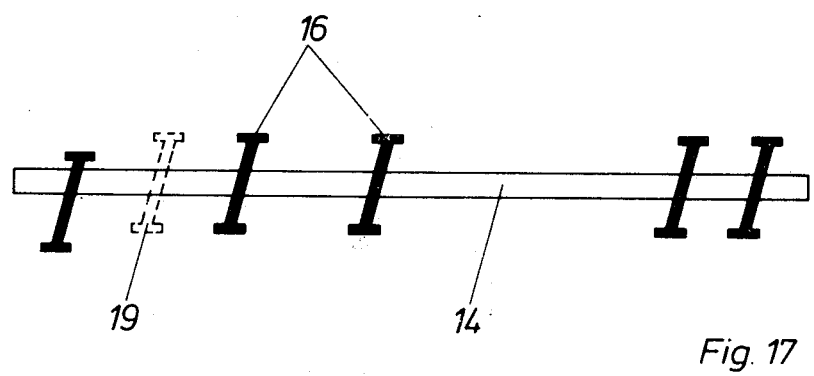
FIG. 17 shows a manipulated coding line with a safeguard against erasure for the fifth example.
Figure 18:
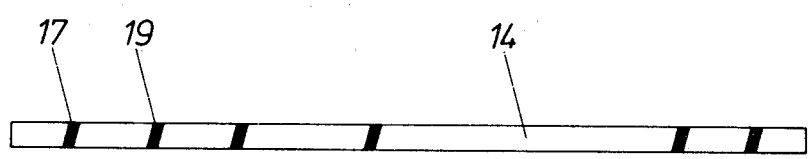
FIG. 18 shows a coding line with a safeguard against erasure, manipulated or unmanipulated, as it appears in the reading device.

The same effect is achieved with a code in which, instead of the total number of symbols being constant, the information is divided into individual blocks with constant numbers of symbols. Such codes are known from telecommunication engineering where they serve to detect random falsifications of information due to some kind of disturbance. In combination with the safeguard against erasure in accordance with the invention, any of these codes is suited to making wilful falsifications of binary coded information on securities detectable. The information line to be protected is printed on a fluorescent stripe of the document. The code mark reader, comprising an UV light source and an optical transmission system whose field stop images on the photomultiplier a vertical bar in the information line, determines the presence or absence of the bar-shaped symbols as the documennt is being transported through it. By a special design of the fluorescent stripe and reduction of the size of the field stop, this very simple reading operation can be simplified even further. As shown in FIG. 16, the fluorescent stripe 14 is imprinted so narrow at half the height of the information line that, even in case of a maximum difference in level 15 between the printed symbols 16, safe interruption 17 of the fluorescent stripe is still insured. The field stop of the reading device is adapted to this width 18 of the fluorescent stripe. Thus, instead of having to perform a previous reading operation, only interruptions of the fluorescent stripe need to be detected. Consequently, it is not the arrangement of bar-shaped symbols of FIG. 16 which appears in the reading device, but the fluorescent stripe of FIG. 18, which is interrupted several times. If a bar 19 was erased on an information line, as shown in FIG. 17, it cannot be seen by visible light. In the reading device, however, this information line will appear with unchanged information, as explained above in the example 3.

Sixth Example (Solution 3):

In this example, a fluorescent substance is admixed to the document shown in FIGS. 3 and 4. Prior to or after printing, the document 4 is provided with a thin, colorless coating of an UV absorber 5, which absorbs ultraviolet rays. The information 3, which contrasts sharply with the background in the visible spectral region, is clearly discernible with the human eye and with optical reading devices. If irradiated with ultraviolet light, all spots where the protective coating was damaged by erasure can thus be detected visually or by machine.

To detect attempts at erasure automatically, the reading device shown in FIG. 20 can be used.

While specific embodiments of the invention have been shown and described in detail to illustrate the application of the principles of the invention, it will be understood that the invention may be embodied otherwise without departing from such principles.

What is claimed is:

1. A valuable security and the like, having safeguard elements against forgery or falsification which can be mechanically examined using light of the visible, ultraviolet, or infrared spectral regions and which are effective, particularly, against erasure, and carrying the ink-impressed information print, said valuable security and the like comprising, in combination, a paper; and a homogeneous protective coating on the paper; the paper, the protective coating and the printing ink having respective light-detectable properties selected from the group consisting of reflectance and fluorescence properties; the respective light-detectable properties of the paper, the protective coating and the printing ink being such that any damage to the protective coating is detectable at a preselected wavelength of light; the reflectance of the protective coating at the wavelength used to read the information print being considerably greater than the reflectance of the printing ink, and the reflectances of the protective coating and the printing ink, at a different wavelength, being substantially equal, while the reflectances of the paper and the protective coating at said different wavelength differ measurably from each other.

2. A valuable security and the like, having safeguard elements against forgery or falsification which can be mechanically examined using light of the visible, ultraviolet or infrared spectral regions and which are effective, particularly against erasure, and carrying an ink-impressed information print, said valuable security and the like comprising, in combination, a paper; and a homogeneous protective coating on the paper; the paper, the protective coating and the printing ink having respective light-detectable properties selected from the group consisting of reflectance and fluorescence properties; the respective light-detectable properties of the paper, the protective coating and the printing ink being such that any damage to the protective coating is detectable at a preselected wavelength of light; said ink-impressed information print comprising a narrow, elongated substantially rectilinear fluorescent stripe intersected by a plurality of bar-shaped symbols spaced from each other longitudinally of the stripe; the bar-shaped symbols and the spaces therebetween being arranged in groups longitudinally of the stripe, and the total of the bar-shaped symbols and the spaces therebetween, in the unaltered original condition of said security and the like, being equal to a preselected number which is constant for all said securities and the like; whereby the erasure or addition of a bar-shaped symbol can be detected by examination of the security under ultra-violet light, due to the total of the bar-shaped symbols and the spaces therebetween differing from such preselected number.

3. A valuable security and the like, according to claim 2, wherein the number of bar-shaped symbols and spaces therebetween in each group is constant for the security.

4. A valuable security and the like, carrying information which is legible in the visible, ultraviolet, or infrared spectral regions and including a protection against falsification, which protection can be mechanically evaluated said valuable security and the like comprising, in combination, a paper; a homogeneous protective coating on said paper; the paper, the protective coating and the printing ink having light-detectable properties selected from the group consisting of reflectance and fluorescence properties such that said information can be read either visually, mechanically, or both visually and mechanically at a wavelength of the reading light source selected in accordance with the light-detectable properties, and the protective coating can be checked for intactness by checking the contrast between the paper and the protective coating at a wavelength of the checking light source selected in accordance with such light-detectable properties.

5. A security according to claim 4, wherein the protective coating has fluorescent properties, with the spectral region of the fluorescent emission not coinciding with the spectral region of the fluorescent emission of the security and the printing ink.

6. A security according to claim 5, wherein the protective coating has fluorescent properties, and the security and the printing ink do not fluoresce.

7. A security according to claim 4, wherein the security contains fluorescent additions, and the fluorescent effect is blocked by the protective coating contrasting with the printing ink.

* * * * *